United States Patent
Yoshimura et al.

(10) Patent No.: US 10,632,939 B2
(45) Date of Patent: Apr. 28, 2020

(54) MULTILAYER TEXTILE SLEEVE AND METHOD OF CONSTRUCTION THEREOF

(75) Inventors: Masanori Yoshimura, Atsugi (JP); Cassie M. Malloy, Bluebell, PA (US); Zhong Huai Zhang, Pottstown, PA (US); Linwood Ludy, Pottstown, PA (US); Danny Winters, Downingtown, PA (US)

(73) Assignee: Federal-Mogul Powertrain, LLC, Southfield, MI (US)

(*) Notice: Subject to any disclaimer, the term of this patent is extended or adjusted under 35 U.S.C. 154(b) by 126 days.

(21) Appl. No.: 13/450,021

(22) Filed: Apr. 18, 2012

(65) Prior Publication Data

US 2013/0040081 A1   Feb. 14, 2013

Related U.S. Application Data

(60) Provisional application No. 61/476,366, filed on Apr. 18, 2011, provisional application No. 61/524,454, filed on Aug. 17, 2011.

(51) Int. Cl.
*B60R 16/02* (2006.01)
*D03D 11/00* (2006.01)
*D03D 11/02* (2006.01)

(52) U.S. Cl.
CPC .......... *B60R 16/0215* (2013.01); *D03D 11/00* (2013.01); *D03D 11/02* (2013.01); *D10B 2403/023* (2013.01); *D10B 2403/0333* (2013.01); *Y10T 428/13* (2015.01)

(58) Field of Classification Search
CPC .... D03D 3/02; D03D 11/02; D10B 2403/023; D10B 2403/0333; B32B 1/08; B32B 2255/02; B32B 5/02; B32B 5/26; Y10T 428/13; B60R 16/0215
USPC .................................................. 428/36.1
See application file for complete search history.

(56) References Cited

U.S. PATENT DOCUMENTS

| 268,366 A | 11/1882 | Gillespie |
| 299,017 A | 5/1884 | Schenck et al. |
| 3,422,815 A | 1/1969 | Jamison |
| 4,025,684 A | 5/1977 | Neidhardt |

(Continued)

FOREIGN PATENT DOCUMENTS

| CN | 101466600 A | 6/2009 |
| CN | 101945755 A | 1/2011 |

(Continued)

OTHER PUBLICATIONS

International Search Report dated Jun. 10, 2013 (PCT/US2012/034060).

*Primary Examiner* — James C Yager
(74) *Attorney, Agent, or Firm* — Robert L. Stearns; Dickinson Wright, PLLC

(57) ABSTRACT

A multilayer textile sleeve and method of construction thereof is provided. The sleeve includes a textile wall having opposite edges extending lengthwise along a longitudinal axis of the sleeve between opposite ends. The opposite edges are configured to overlap one another to bound a central cavity of the sleeve. The wall has an inner layer with opposite inner and outer faces and an outer layer with opposite inner and outer faces. The inner and outer layers overlap one another and are constructed of interlinked yarn. The inner and outer layers are integrally connected to one another across interlinked portions adjacent the opposite edges by yarn common to each of the inner and outer layers.

4 Claims, 4 Drawing Sheets

(56) References Cited

U.S. PATENT DOCUMENTS

| | | |
|---|---|---|
| 5,273,080 A | 12/1993 | Morohashi et al. |
| 2009/0218002 A1 | 9/2009 | Kashihara |
| 2009/0226653 A1 | 9/2009 | Harris et al. |
| 2010/0089515 A1 | 4/2010 | Malloy et al. |
| 2010/0313989 A1 | 12/2010 | Kashihara |
| 2010/0316822 A1 | 12/2010 | Malloy |

FOREIGN PATENT DOCUMENTS

| | | |
|---|---|---|
| DE | 2411941 A1 | 9/1975 |
| EP | 0432535 A1 | 6/1991 |
| JP | H02234945 A | 9/1990 |
| WO | 2006047818 A1 | 5/2006 |
| WO | 2009089238 A2 | 7/2009 |

FIG. 1A
PRIOR ART
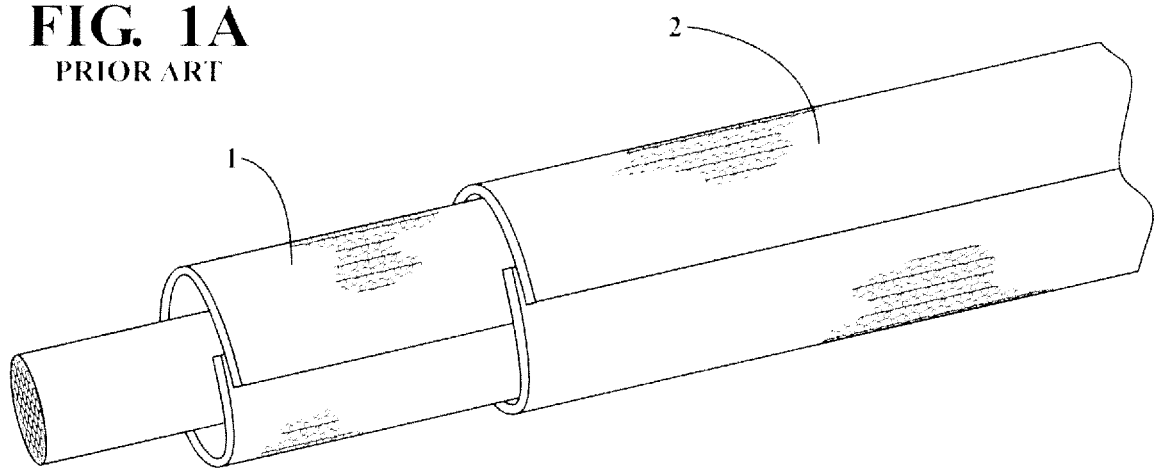
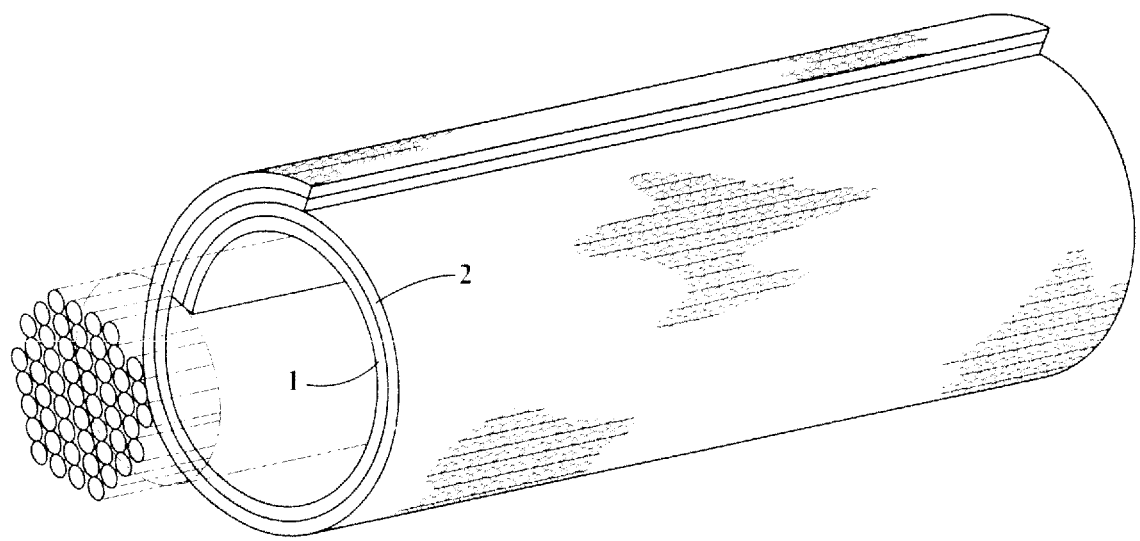
FIG. 1B
PRIOR ART

MULTILAYER TEXTILE SLEEVE AND METHOD OF CONSTRUCTION THEREOF

CROSS-REFERENCE TO RELATED APPLICATIONS

This application claims the benefit of U.S. Provisional Application Ser. No. 61/476,366, filed Apr. 18, 2011, and of U.S. Provisional Application Ser. No. 61/524,454, filed Aug. 17, 2011, which are both incorporated herein by reference in their entirety.

BACKGROUND OF THE INVENTION

1. Technical Field

This invention relates generally to protective textile sleeves, and more particularly to multilayer textile sleeves and to their method of construction.

2. Related Art

It is known to first fabricate individual layers of textile material and then attach the individual layers to one another in a secondary operation to construct a multilayer material. For example, if the desired multilayer material being constructed requires an inner layer to provide one type of property, such as low friction, and an outer layer to provide another type of property, such as insulation and/or abrasion resistance, one piece of textile material can be constructed in a first operation; a second piece of material can be constructed in a second operation, and then, the first and second pieces of material can be joined in a third operation via material separate from the first and second pieces of material to provide the multilayer material. Although the end product is made having the desired properties, it comes at an expense, particularly given the manufacturing inefficiencies compiled over numerous operations.

Further, in order to provide the protection required to prevent unwanted exposure of an elongate member or members being carried in a cavity of a sleeve, as shown in the prior art of FIGS. 1A-1B, it is known to wrap the elongate member or members, such as wires or a fluid carrying pipe, for example, with a first sleeve 1, with the first sleeve 1 then being wrapped with a separate second sleeve 2. This is particularly useful in vehicle applications that must meet increasing demands to reduce the voltage of high voltage units to 60V or less within a five second interval after a crash condition to minimize the potential for electric arcing, commonly referred to as a short circuit, between the wires within the sleeve and electrically conducting members in the vehicle. In a crash condition, sleeves are subject to damage via extreme concentric loading, and thus, a multi-layered wall sleeve is desired to ensure the resulting damage does not leave the wires within the sleeve exposed. Although the separate, individually wrapped sleeves can ultimately provide the type of protection desired, it comes at a cost. Having to manufacture the sleeves 1, 2 separately from one another and further, having to wrap the sleeves 1, 2 separately, and in some cases fixing the sleeves 1, 2 to one another, is inefficient and costly. Further, with the sleeves 1, 2 being constructed of separate pieces of material, typically the diametric area occupied by the sleeves 1, 2 is increased, thereby occupying valuable space, which in some cases may not be readily available. Further, yet having to use separate sleeves to achieve the protection desired requires stocking and inventorying double the number of sleeves as for a single sleeve application, which adds further complexity and cost.

SUMMARY OF THE INVENTION

A multilayer textile sleeve includes a textile wall having opposite edges extending lengthwise along a longitudinal axis of the sleeve between opposite ends. The opposite edges are configured to overlap one another to bound a central cavity of the sleeve. The wall has an inner layer with opposite inner and outer faces and an outer layer with opposite inner and outer faces. The inner and outer layers overlap one another and are constructed of interlinked yarn. The inner and outer layers are integrally connected to one another across interlinked portions adjacent the opposite edges by yarn common to each of the inner and outer layers.

According to another aspect of the invention, the first and second layers each have warp yarn filaments extending lengthwise between the opposite ends and fill yarn filaments extending widthwise between the opposite edges, wherein at least one of the fill yarn filaments of one of the first and second layers is interlocked with one of the warp yarn filaments of the other of the first and second layers.

According to another aspect of the invention, the first and second layers are integrally connected to one another adjacent both of the lengthwise extending opposite edges, while a central portion of the inner and outer layers extending between the opposite edges remain detached from one another. Accordingly during wrapping, the inner and outer layers can shift freely relative to one another within the central portion.

According to another aspect of the invention, each of the first and second layers have opposite faces, wherein one of the faces of the first layer is abutting one of the faces of the second layer and the abutting faces are integrally connected over their entire abutting surfaces.

In accordance with another aspect of the invention, a method of constructing a textile sleeve is provided. The method includes interlacing yarn and forming a textile wall having overlapping inner layer and outer layers extending between opposite edges lengthwise along a longitudinal axis between opposite ends. The method further includes interlinking the inner and outer layers with one another adjacent the opposite edges with a yarn common to each of the inner and outer layers.

In accordance with another aspect of the invention, the method includes leaving the inner face of the outer layer and the outer face of the inner layer detached from one another between the interlinked portions.

BRIEF DESCRIPTION OF THE DRAWINGS

These and other aspects, features and advantages of a multilayer sleeve constructed in accordance with the invention will become more readily appreciated when considered in connection with the following detailed description of presently preferred embodiments and best mode, appended claims and accompanying drawings, in which:

FIGS. 1A and 1B illustrate a two-piece multilayered sleeve configured in accordance with the prior art;

DETAILED DESCRIPTION OF PRESENTLY PREFERRED EMBODIMENTS

Figure 2:
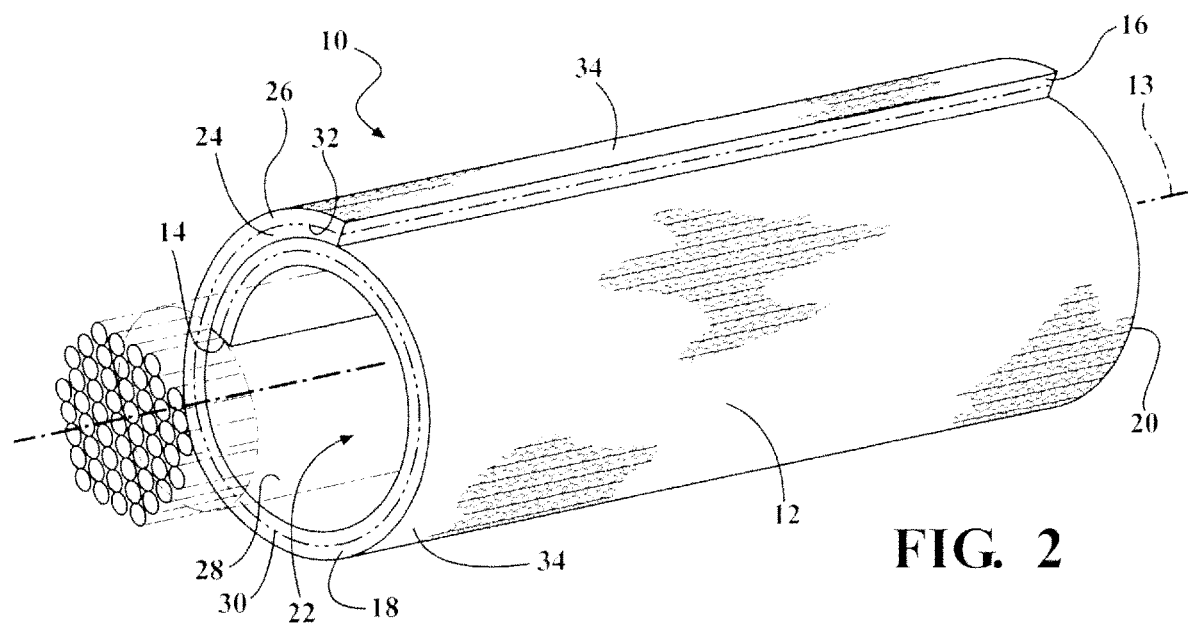
FIG. 2 is a schematic perspective view of a sleeve constructed in accordance with one aspect of the invention.
Figure 3:
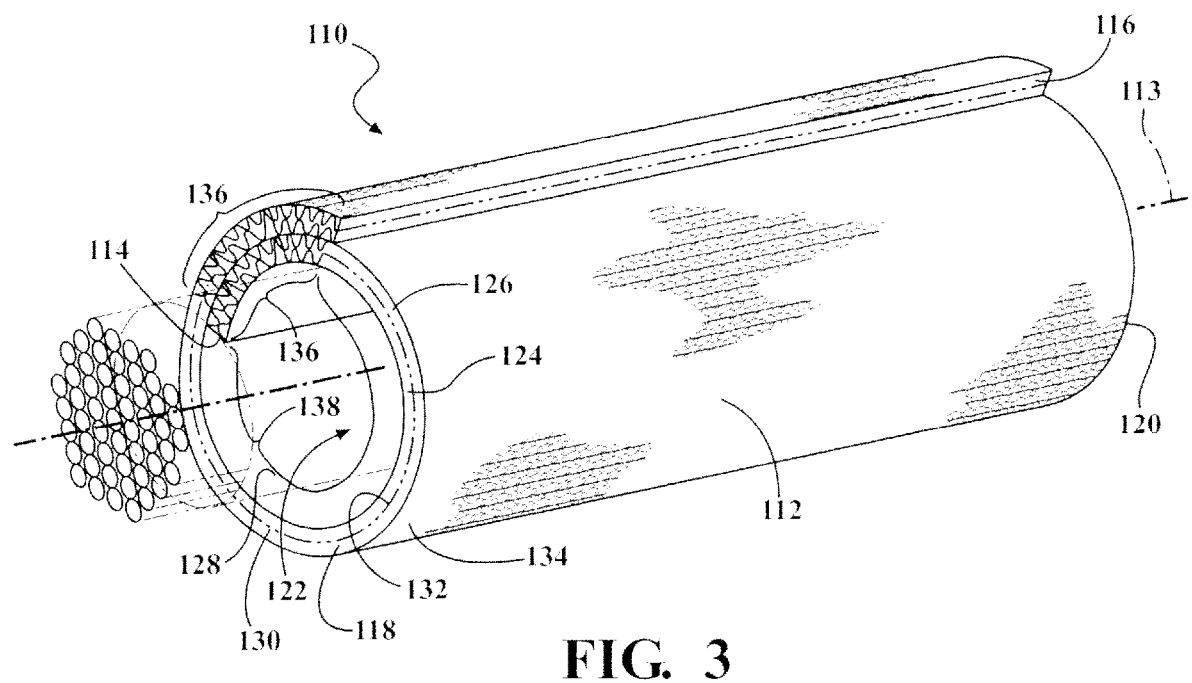
FIG. 3 is a schematic perspective view of a multilayer sleeve constructed in accordance with another aspect of the invention.

Referring in more detail to the drawings, FIGS. 2 and 3 illustrate textile sleeves constructed in accordance with the invention having a multilayered, integrally constructed, monolithic wall of selected yarns, using monofilaments and/or multifilaments of the desired type of yarn for the intended application. It should be understood that any suitable combination of yarn types and materials can be used to achieve the protection desired, whether it be abrasion resistance, resistance to chemical attached, resistance to heat or flame, resistance to impact, etc.. Further, the sleeves depicted are constructed using a weaving process, though it is contemplated that knitting and braiding processes could also be used.

In FIG. 2, a sleeve 10 constructed in accordance with one aspect of the invention is shown. The sleeve 10 has a wall 12 with opposite edges 14, 16 extending along a longitudinal central axis 13 of the sleeve 10 between open opposite ends 18, 20. The opposite edges 14, 16 extend parallel or substantially parallel to the axis 13 and are biased into overlapping relation with one another to bring the wall 12 into a tubular configuration and to fully enclose a central cavity 22 of the sleeve 10, such as via a heat-set bias imparted in the material of the wall 12 and/or fastener(s). The wall 12 has multiple layers, shown as an inner layer 24 and outer layer 26 integrally constructed in a single process, such as a weaving process. The dual layer construction of the wall 12 provides the sleeve 10 with a sufficient degree of rigidity to provide an increased ability to resist exposure of the contents carried within the cavity 22 through the wall 12, while remaining flexible to allow the sleeve 10 to be routed about corners, as desired. This can prove particularly beneficial if the contents within the cavity 22 includes high voltage wires, or the like.

Figure 2A:
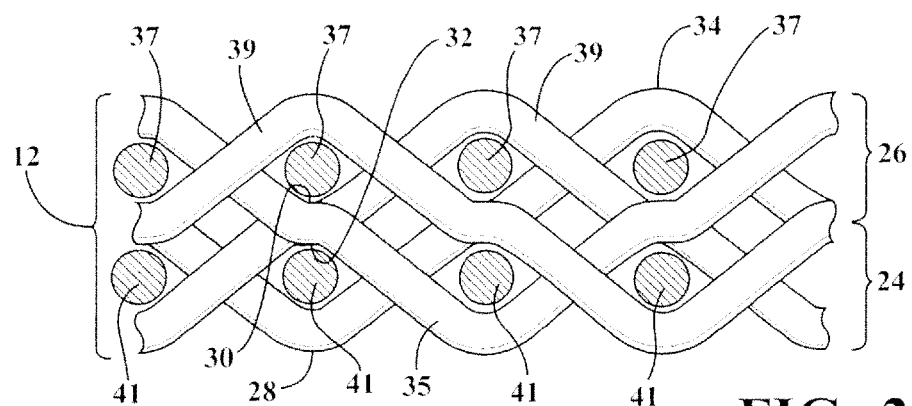
FIG. 2A is a partial cross-sectional side view of a wall of the sleeve of FIG. 2.
Figure 2B:
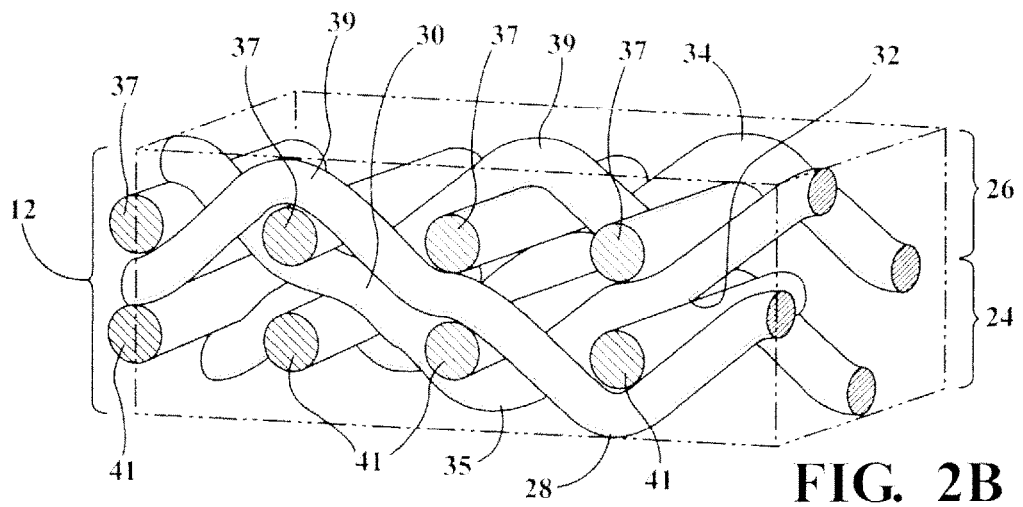
FIG. 2B is a partial cross-sectional perspective view of the wall of the sleeve of FIG. 2.

As best shown in FIGS. 2A and 2B, the inner layer 24 has inner and outer faces 28, 30 and the outer layer 26 has inner and outer faces 32, 34. The outer face 30 of the inner layer 24 and the inner face 32 of the outer layer 26 are interwoven with one another across their entire abutting outer and inner faces 30, 32, respectively. Accordingly, the inner and outer layers 24, 26 are inseparable over their entire abutting surfaces under a force tending to pull the inner and outer layers 24, 26 away from one another. This is done by interweaving at least some of the yarns of the inner layer 24 with at least some of the yarns of the outer layer 26, or by interweaving at least some of the yarns of the outer layer 26 with at least some of the yarns of the inner layer 24, or by interweaving at least some of the yarns of the inner layer 24 with at least some of the yarns of the outer layer 26 and interweaving at least some of the yarns of the outer layer 26 with at least some of the yarns of the inner layer 24. In the embodiment shown, at least some selected weft yarns 35 of the inner layer 24 are interwoven with at least some selected warp yarns 37 of the outer layer 26 by displacing the selected weft yarns 35 of the inner layer 24 into the path of selected warp yarns 37 of the outer layer 26 and at least some selected weft yarns 39 of the outer layer 26 are likewise interwoven with at least some selected warp yarns 37 of the inner layer 24. Accordingly, the warp yarns 41, 37 of the inner and outer layers 24, 26 remain wholly separate from one another and within their respective layers 24, 26, while at least some of the weft yarns 35, 39 of the inner and outer layers 24, 26 are common to one another, and thus, extend within each of the layers 24, 26.

If the sleeve 10 is intended to be a self-wrapping sleeve, at least some of the weft yarns 35, 39 of at least one of the inner and outer layers 24, 26 are provided as heat-settable yarn, such as monofilaments of PET, for example. Of course other types of weft yarn can be included along with the heat-settable yarn to provide enhanced coverage and flexibility to the wall 12, such as suitable multifilament yarns, for example. Further, it should be recognized that various fire-retardant and chemical resistant yarns can be included in the weft and/or warp yarns, as desired.

In FIG. 3, a sleeve 110 constructed in accordance with another aspect of the invention is shown, wherein the same reference numerals as used above, offset by a factor of 100, are used to identify like features as described above and illustrated in FIG. 2. As with the sleeve 10 discussed above, the sleeve 110 has a wall 112 with opposite edges 114, 116 extending along a longitudinal central axis 113 between opposite ends 118, 120. The opposite edges 114, 116 are biased into overlapping relation with one another to fully enclose a central cavity 122 of the sleeve 110, as discussed above. Further, the wall 112 has multiple layers, shown as an inner layer 124 and outer layer 126 integrally constructed with one another in a single process used to construct the layers 124, 126, such as a weaving process.

Figure 3A:
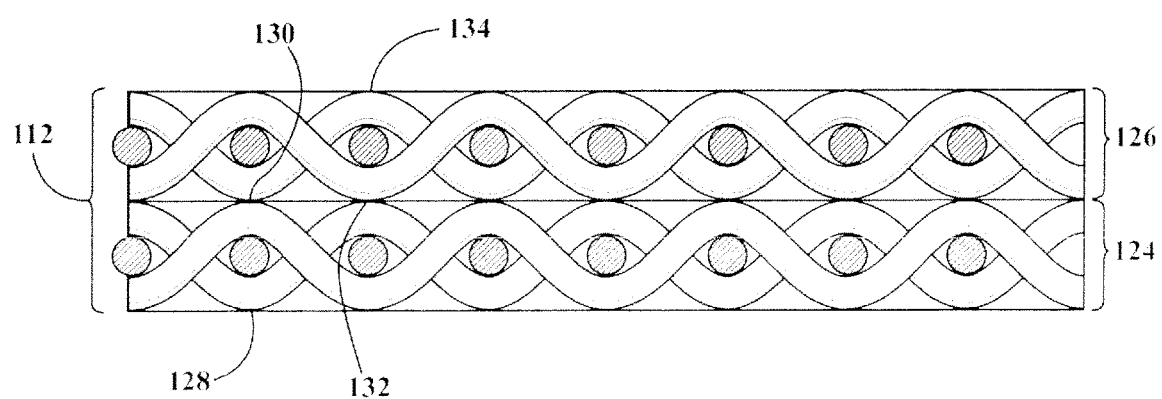
FIG. 3A is a partial cross-sectional side view of a wall of the sleeve of FIG. 3.
Figures 3B, 4:
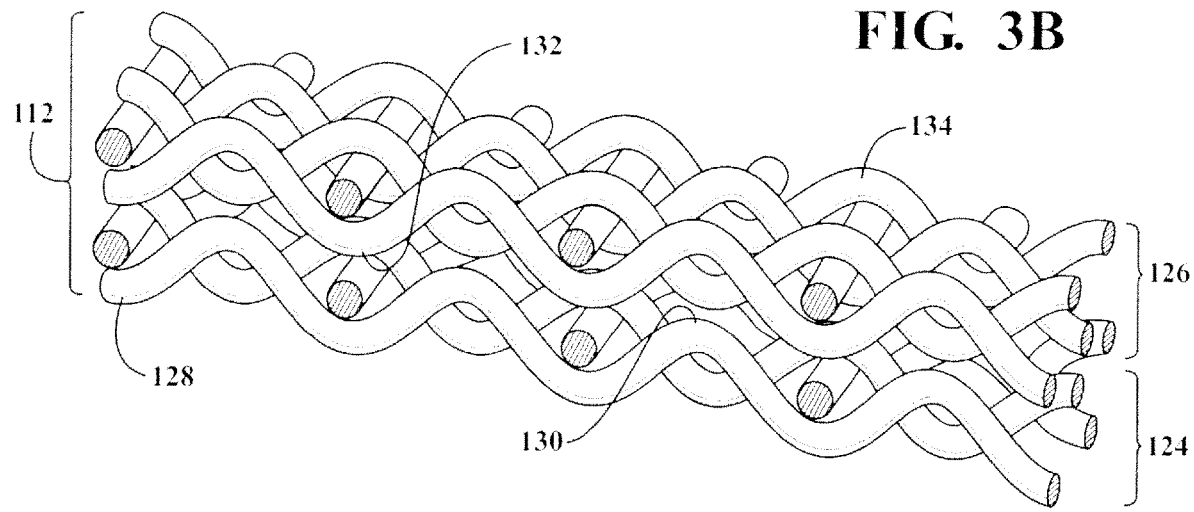
FIG. 3B is a partial cross-sectional perspective view of the wall of the sleeve of FIG. 3.
FIG. 4 is a weave pattern used to construct the sleeve of FIG. 3.

As best shown in FIGS. 3A and 3B, the inner layer 124 has inner and outer faces 128, 130 and the outer layer 126 has inner and outer faces 132, 134. As with the sleeve 10, the inner layer 130 and the outer layer 26 are interwoven with one another in a single process used to initially construct the layers 124, 126 to form a monolithic piece of material, however, unlike the sleeve 10, the inner and outer layers 124, 126 are not interwoven with one another across their entire abutting outer and inner faces 130, 132, respectively. Rather, only the portions or regions 136 of the inner and outer layers 124, 126 immediately adjacent the opposite edges 114, 116 are interwoven with one another, while the intermediate regions 138 of the inner and outer layers 124, 126 extending between the joined regions 136 remain separate from one another. This is done by interlinking and displacing at least some of the yarns of the inner layer 124 with and into the path of at least some of the yarns of the outer layer 126, or by interlinking and displacing at least some of the yarns of the outer layer 126 with and into the path of at least some of the yarns of the inner layer 124, or by interlinking and displacing at least some of the yarns of the inner layer 124 with and into the path of at least some of the yarns of the outer layer 126 and interlinking and displacing at least some of the yarns of the outer layer 126 with and into the path of at least some of the yarns of the inner layer 124 immediately adjacent the opposite edges 114, 116, while at the same time leaving the remaining intermediate portions of the inner layer inner face 128 and outer layer outer face 134 detached and free from one another.

For example, as shown in the weave pattern of FIG. 4, at least some of the weft yarns of the inner layer 124 can be interwoven with at least some of the warp yarns of the outer layer 126 and/or at least some of the weft yarns of the outer layer 126 can be interwoven with at least some of the warp yarns of the inner layer 124. In the embodiment shown, a plurality of warp yarns in one of the inner or outer layers 124, 126 adjacent the opposite edges 114, 116 are interwoven with a corresponding plurality of weft yarns in the other of the inner or outer layers 124, 126 adjacent the opposite edges 114, 116 over a predetermined portion of the width, but less than the complete width, extending from the respective edges 114, 116. This is done by moving the respective warp yarn of one of the layers 124, 126 into the path of the corresponding weft yarn of the opposite layer 124, 126, thereby causing the warp and weft yarns to become interlinked with one another, thereby tying the inner and outer layers 124, 126 to one another.

In the embodiment illustrated schematically in FIG. 3, the inner and outer layers 124, 126 are tied or interlinked with one another along the edge portions 136 immediately adjacent the opposite edges 114, 116, extending along the entire length of the sleeve 110, while the central portion 138 of the inner and outer layers 124, 126 extending between the edge portions 136 along the entire length of the sleeve 110 remain completely detached from one another. As such, upon the wall 112 assuming its wrapped configuration, the interlinked edge portions 136 overlap one another in radially aligned fashion. The interlinked edge portions 136 adjacent the opposite edges 114, 116 provide the sleeve 110 with its single piece construction while also providing a predetermined degree of rigidity in the regions desired, which in turn prevents the inner and outer layers 124, 126 from shifting relative to one another or otherwise separating and wrinkling during manufacture. On the other hand, the non-linked central portions 138 provide the sleeve 110 with an ability to remain flexible in that the inner and outer layers 124, 126 can shift slightly relative to another while wrapping the sleeve 110 and routing the sleeve 110 about bends and corners. Accordingly, the intermediate portions 138 of the inner and outer layers 124, 126 extending between the interlinked portions 136 are wholly separate and detached from one another, and thus, would fall away from one another if the interlinked edges 114, 116 were cut. This allows for slight relative movement between the intermediate portions 138 of the inner and outer layers 124, 126, which is desired during wrapping to avoid buckling, and also provides a slightly increased thickness to the wall 112 for added protection.

It should be recognized that the warp yarn filaments of one of the inner or outer layers 124, 126 can be interlinked with the weft yarn filaments of the underlying/overlying inner or outer layer 124, 126 as desired, in any location and over any desired area. Accordingly, the interlinked portion(s) 136 and non-linked portion(s) 138 can be formed in any region of the sleeve wall 112, as desired.

Obviously, many modifications and variations of the present invention are possible in light of the above teachings. It is, therefore, to be understood that within the scope of the appended claims, the invention may be practiced otherwise than as specifically described.

What is claimed is:

1. A multilayer textile sleeve, comprising:
a textile wall having a width extending widthwise between opposite edges and a length extending lengthwise along a longitudinal axis of the sleeve between opposite ends, said wall having an inner layer with opposite inner and outer faces and an outer layer with opposite inner and outer faces, said outer face of said inner layer and said inner face of said outer layer facing one another in overlying relation and being constructed of woven warp and weft yarns;
said outer face of said inner layer and said inner face of said outer layer being integrally connected to one another via interlinked portions extending along the entirety of said opposite edges from one of said opposite ends to the other of said opposite ends, each of said interlinked portions including a plurality of said weft yarns from at least one of said inner and outer layers being interwoven with a plurality of said warp yarns from the other of said inner and outer layers, said interlinked portions extending widthwise from each of said opposite edges along only a portion of said width and overlapping one another in an overlapped region to bound a lengthwise extending central cavity; and
wherein said inner face of said outer layer and said outer face of said inner layer remain completely detached from one another along a non-overlapped intermediate region extending over a plurality of said warp yarns of said inner and outer layers and over the entirety of a portion of said width extending from one of said interlinked portions to the other of said interlinked portions.

2. The sleeve of claim 1 wherein at least one of said inner and outer layers includes heat-set weft yarns to bias said wall into a self-wrapped tubular configuration.

3. The sleeve of claim 1 wherein said interlinked portions include a plurality of weft yarns of the inner layer being interwoven with a plurality of warp yarns of the outer layer and a plurality of selected weft yarns of the outer layer being interwoven with a plurality of warp yarns of the inner layer.

4. The sleeve of claim 3 wherein said warp yarn of said inner layer remain entirely within said inner layer and said warp yarn of said outer layer remain entirely within said outer layer.

* * * * *